Sept. 1, 1953 A. W. UHL 2,651,029
INDICATOR FOR APPARATUS ADAPTED TO
DETECT SUSPENDED MATTER IN FLUIDS
Filed March 6, 1951 3 Sheets-Sheet 1

INVENTOR
ARTHUR W. UHL
BY
J. William Carson
ATTORNEY

Sept. 1, 1953  A. W. UHL  2,651,029
INDICATOR FOR APPARATUS ADAPTED TO
DETECT SUSPENDED MATTER IN FLUIDS
Filed March 6, 1951  3 Sheets-Sheet 2

INVENTOR
ARTHUR W. UHL
BY
J. William Carson
ATTORNEY

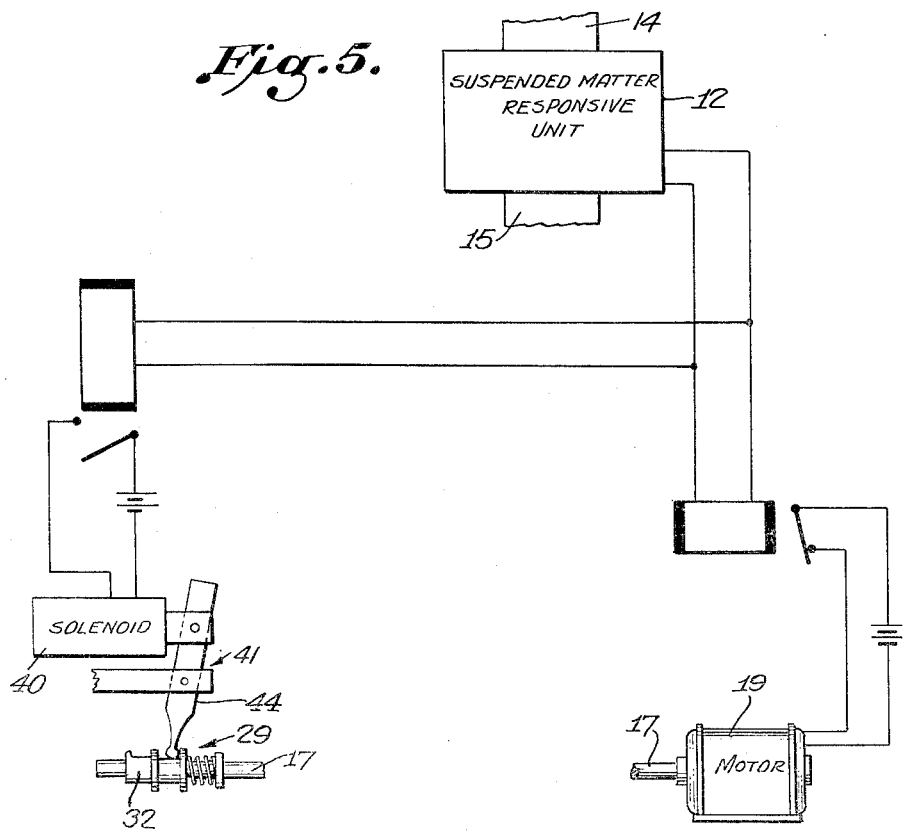

Patented Sept. 1, 1953

2,651,029

UNITED STATES PATENT OFFICE 2,651,029

INDICATOR FOR APPARATUS ADAPTED TO DETECT SUSPENDED MATTER IN FLUIDS

Arthur W. Uhl, Inwood, N. Y., assignor to Specialties Development Corporation, Belleville, N. J., a corporation of New Jersey Application March 6, 1951, Serial No. 214,078

7 Claims. (Cl. 340—213)

The present invention relates to apparatus for detecting the presence and the origin of suspended matter in fluids, such as smoke in air and the like; and, more particularly, relates to an indicator for such apparatus adapted to be utilized, for example, in connection with the type of apparatus disclosed in my copending application for United States Letters Patent, Serial No. 162,643, filed May 18, 1950.

In my prior application, there is shown apparatus which generally comprises valve mechanism, including an operating shaft, for successively sampling the atmosphere of a plurality of spaces, such as cargo holds, storage vaults or the like in which a fire may occur, means for detecting the presence of smoke in the samples, and locally observable means associated with the operating shaft for giving a visual indication from which space the sample has been removed in the event smoke is detected therein. In the normal operation of such apparatus, the operating shaft is rotated continuously until a smoke condition is detected whereupon rotation of this shaft ceases and the indicating means serve to designate the space in which there is smoke.

In certain installations of such apparatus, it is desirable to provide for an indication of the space in which smoke has originated at a remote location, for example, on a central instrument or control panel or in the wheel house or control room aboard ship. While such remote indicating devices are generally well known, they are not practical for use with the foregoing apparatus wherein the operating shaft is rotated continuously. Primarily, this is because the switch means utilized with such device cannot withstand continuous operation over long periods without wear and deterioration thereof and consequently becoming inoperative or otherwise defective.

Accordingly, an object of the present invention is to provide improved indicating devices of the foregoing character for use with continuously operated apparatus for detecting the presence and origin of suspended matter in fluids.

Another object is to provide such indicating devices which are not subject to the foregoing difficulties and objections and are not adversely affected over long periods of continuous use.

A further object is to provide such indicating devices including switch means and means for operating the switch means which are normally ineffective and are rendered effective only upon detection of suspended matter whereby the switch means are operated only when suspended matter is detected and thus are not subjected to continuous operation.

A still further object is to provide such indicating devices which are simple, practical and economical in construction and are reliable in operation.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are accomplished by providing a plurality of indicating means, switch means for each of the indicating means, means adapted for effecting operation of the switch means successively, means for normally maintaining the switch means operating means ineffective, and means operable in response to the detection of suspended matter for rendering the switch means operating means effective.

A preferred embodiment of the invention has been chosen for purposes of illustration and description, and is shown in the accompanying drawings, forming a part of the specification, wherein:

Figure 5 is a schematic view illustrating a wiring diagram of a circuit for simultaneously de-energizing the shaft operating motor and energizing the solenoid for rendering the switch means effective in response to actuation of the means for detecting suspended matter.

Figure 1:
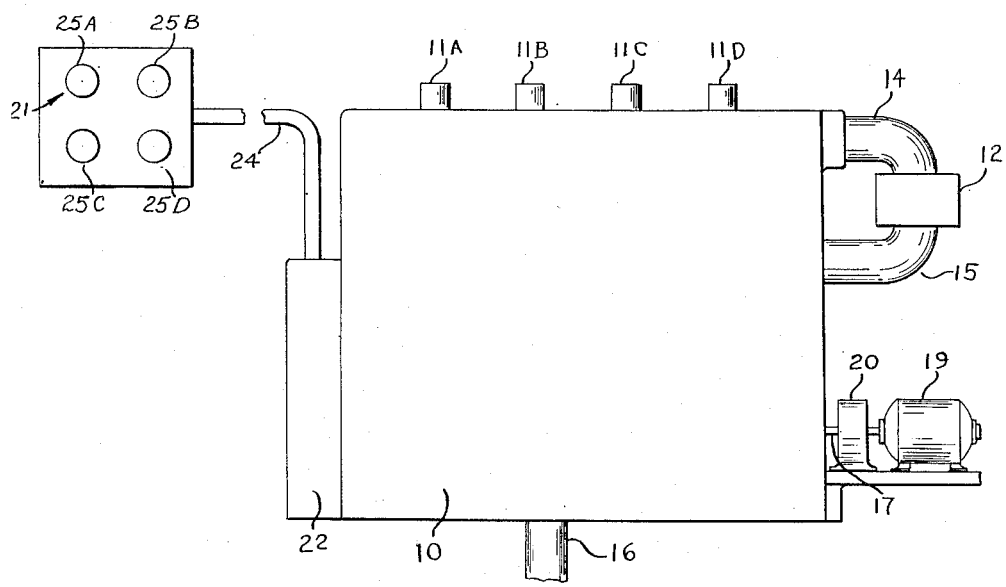
Figure 1 is a generally schematic elevational view of aparatus for detecting suspended matter in fluids embodying the present invention.

Referring to the drawings in detail and more particularly to Figure 1 thereof, there is shown apparatus comprising a cabinet 10 for housing valving mechanism including valves, such as disclosed in my aforementioned prior application, for successively taking samples from a plurality of spaces (not shown) by means of conduits 11A, 11B, 11C and 11D, a unit 12 responsive to suspended matter having an inlet conduit 14 connected with the valves and having an outlet conduit 15 connected to a suction fan (not shown) provided with an exhaust conduit 16, a valving mechanism operating shaft 17 rotated by a motor 19 through gearing 20, an indicator 21, indicator control means 22 associated with the operating shaft as about to be described, and cable means 24 connecting the indicator and its control means to enable the indicator to be installed at a remote location.

As already mentioned herein, this apparatus upon the detection of smoke is adapted to indicate the origin thereof, and for this purpose the indicator 21 has a plurality of indicating means 25A, 25B, 25C and 25D corresponding in number to the number of spaces to be supervised and each being associated with a space connected to the apparatus by the conduits 11A, 11B, 11C and 11D, respectively.

The indicator 21, for example, may comprise a panel having glass covered apertures therein behind which electrically illuminated lamps are positioned, but other known forms of indicators or so-called annunciators may be utilized as desired.

Figure 2:
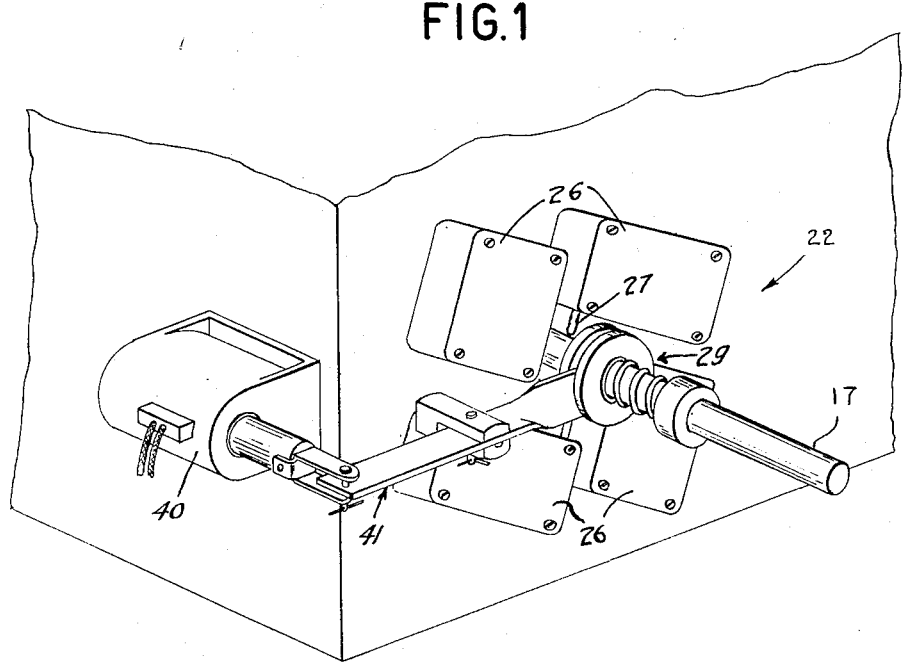
Figure 2 is a fragmentary perspective view of indicating means control means associated with the operating shaft of the apparatus.
Figure 3:
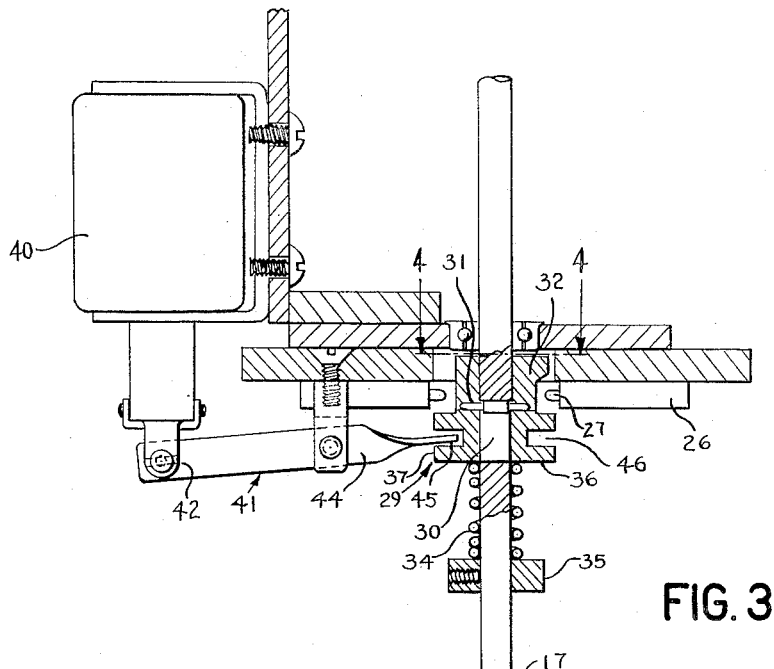
Figure 3 is a plan view, partly in section, of the control means shown in Figure 2.
Figure 4:
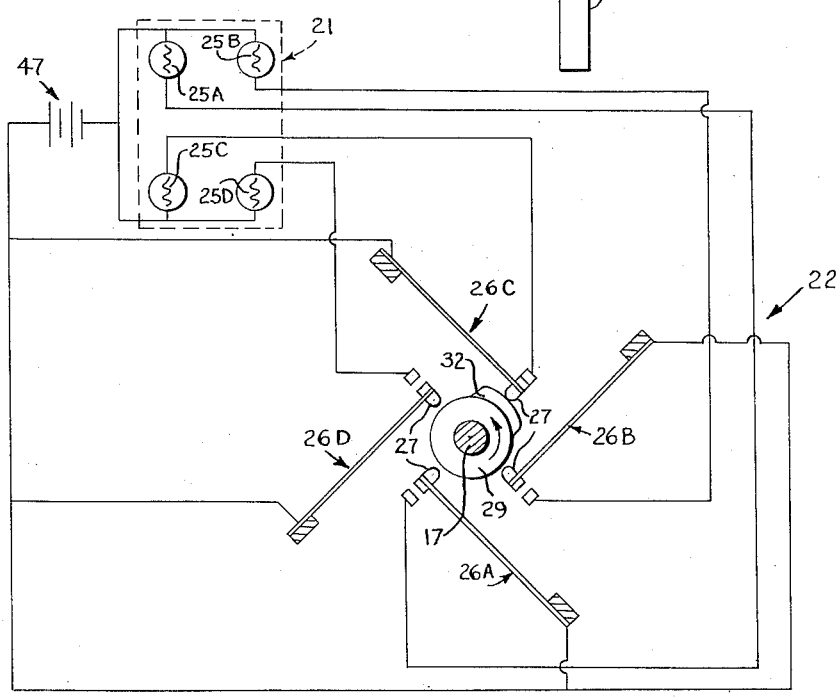
Figure 4 is a schematic view illustrating a wiring diagram of a circuit including the indicating means and the switch means and illustrating the switch means operating means as viewed along the line 4—4 on Figure 3.

The indicator control means 22 are illustrated in detail in Figures 2, 3 and 4. These means comprise normally open switch means 26A, 26B, 26C and 26D, such as a micro-switch, for each of the indicating means 25A, 25B, 25C and 25D, respectively. The switches are circumferentially spaced about the operating shaft 17 and have an operating element 27 facing the shaft and adapted to be engaged by a switch actuating member 29 about to be described.

The switch actuating member 29, as shown in Figures 3 and 4, has a central bore for receiving the shaft 17 and is slidably mounted on the shaft and is arranged for rotation therewith by providing a longitudinal slot 30 in the shaft and a radially extending pin 31 positioned in the slot and having its ends supported by the body of the member 29. The member 29 has a cam element 32 adjacent one end thereof adapted to effect closing of any particular switch. The element 32 in the illustrative embodiment extends about ninety degrees about the periphery of the member 29 and in this manner is so constructed and arranged to at all times be adapted to engage one of the operating elements and at any particular time to engage only one of the operating elements, the purpose of which will become apparent hereinafter.

The member 29 having the cam element 32 thereon normally is maintained in a position on the shaft (Figure 3) to prevent engagement of the switch operating elements 27 by the cam element. This may be accomplished by a compression spring 34 or the like having one end engaging a stop or collar 35 on the shaft 17 and having its other end engaging an end face 36 of a cylindrical portion 37 of the member 29.

Suitable means operable in response to the detection of suspended matter in the fluid being sampled are provided for rendering the switch actuating member effective. Such means, as shown herein, may comprise a power actuated solenoid 40, and a pivotally mounted lever 41 having an arm 42 connected to the armature of the solenoid and having an arm 44 formed with a follower 45 extending into an annular groove 46 formed on the cylindrical portion 37 of the member 29.

As shown in Figure 4, the switches are normally open and are connected in a circuit with the lamps and a source of electrical energy 47 so that upon closing of a switch its lamp is illuminated.

In operation the parts of the apparatus normally are positioned as best shown in Figure 3. Assuming that the shaft is being rotated continuously in a counterclockwise direction as viewed in Figure 4, the cam element 32 is adapted to successively engage the switch operating elements of the switches 26A, 26B, 26C and 26D at the time fluid is sampled from the corresponding spaces in connection with the inlet conduits 11A, 11B, 11C and 11D, respectively. However, during normal operation of the apparatus, that is, in the absence of suspended matter in the sample, the cam element 32 is out of line with the operating elements 27 and is ineffective to engage the same (Figure 3).

Should suspended matter be detected by the responsive unit 12, suitable means including electrical circuits (Figure 5) under the control of the unit 12 cause rotation of the shaft 17 to cease and effect actuation of the solenoid 40 whereby the lever 41 is rocked in a clockwise direction as viewed in Figure 3, the member 29 is moved in opposition to the spring 34 and the cam element is brought into engagement with the operating element of the switch associated with the space in which suspended matter has been detected to close the switch, for example, the switch 26C, as shown in Figure 4. The switch will then be closed to establish a circuit through the indicating means 25C which will be illuminated to give an indication that the suspended matter originated in the space associated with the indicating means 25C.

After the trouble has been investigated and any undesirable condition has been corrected, the solenoid 40 is de-energized to enable the spring 34 to again maintain the cam element out of switch operating element engaging position, and the shaft 17 is again caused to rotate.

From the foregoing description, it will be seen that the present invention provides a simple, practical and reliable indicator control mechanism wherein the switches during normal functioning of the detecting apparatus are not operated at all and hence are not subject to wear and deterioration resulting in breakdown eventually. However, should an undesirable condition be detected, the switch controlling the indicating means identifying the origin of such condition is effectively operated. Actually, the switches are operated only in response to a condition and thus have an exceedingly long life whereby inspection, maintenance and repair of the remote indicating device is reduced to a minimum, if not entirely eliminated. This is highly desirable because it increases the overall reliability of the apparatus to designate the origin of the undesirable condition.

As various changes may be made in the form, construction and arrangement of the parts herein, without departing from the spirit and scope of the invention and without sacrificing any of its advantages, it is to be interpreted as illustrative and not in any limiting sense.

I claim:

1. In apparatus for detecting suspended matter in fluids, the combination of a plurality of indicating means, switch means for each of said indicating means, rotatable cam means adapted for effecting operation of said switch means successively, means for normally maintaining said cam means ineffective to contact and operate said switch means, and means operable in response to the detection of suspended matter in fluids for rendering said cam means effective to operate said switch means.

2. In apparatus for detecting suspended matter in fluids, the combination of a plurality of electrically operated indicating means, an energizing circuit including a normally open switch for each of said indicating means, rotary means adapted for effecting operation of said switches including a cam member for successively contacting and closing said switches, means for normally maintaining said member out of switch closing position, and means operable in response to the detection of suspended matter in fluids for moving said cam member into switch contacting and closing position.

3. In apparatus for detecting suspended matter in fluids, the combination of a plurality of indicating means, a rotatable shaft, switch means for each of said indicating means spaced circumferentially about said shaft, a member slidably mounted on said shaft and connected for rotation therewith including a cam element adapted for successively effecting operation of said switch means, means for normally maintaining said member in a position on said shaft to render said cam element ineffective to operate said switch means, and means operable in response to the detection of suspended matter in fluids for moving said member into a position on said shaft to render said cam element effective to operate said switch means.

4. In apparatus for detecting suspended matter in fluids, the combination of a plurality of indicating means, a rotatable shaft, switch means for each of said indicating means spaced circumferentially about said shaft, a member slidably mounted on said shaft and connected for rotation therewith including a cam element adapted for successively effecting operation of said switch means, spring means for normally maintaining said member in a position on said shaft to render said cam element ineffective to operate said switch means, and power actuated means operable in response to the detection of suspended matter in fluids for moving said member into a position on said shaft to render said cam element effective to operate said switch means.

5. In apparatus for detecting suspended matter in fluids, the combination of a plurality of indicating means, a rotatable shaft, switch means for each of said indicating means, said switch means being spaced circumferentially about said shaft and each including an operating element facing said shaft, a member slidably mounted on said shaft and connected for rotation therewith including a cam element adapted for successively engaging said operating elements to effect successive operation of said switch means, said cam element being so constructed and arranged to at all times be adapted to engage one of said operating element and at any particular time engage only one of said operating elements, means for normally maintaining said member in a position on said shaft to prevent engagement of said operating elements by said cam element, and means operable in response to the detection of suspended matter in fluids for moving said member into a position on said shaft to render said cam element effective to engage said operating elements.

6. In apparatus for detecting suspended matter in fluids, the combination of a plurality of indicating means, a rotatable shaft, switch means for each of said indicating means, said switch means being spaced circumferentially about said shaft and each including an operating element facing said shaft, a member on said shaft, means for slidably mounting said member on said shaft and connecting said member for rotation with said shaft, said member including an annular guideway and a cam element adapted for successively engaging said operating elements to effect successive operation of said switch means, means for normally maintaining said member in a position on said shaft to prevent engagement of said operating elements by said cam element, a pivotally mounted lever having a pair of arms, one of said arms having means for connecting the same with said annular guideway, and power actuated means operable in response to the detection of suspended matter in fluids and being connected to the other arm of said lever for rocking the same to move said member into a position on said shaft to render said cam element effective to engage said operating elements.

7. In apparatus for detecting suspended matter in fluids, the combination of a plurality of indicating means, a rotatable shaft, switch means for each of said indicating means, said switch means being spaced circumferentially about said shaft and each including an operating element facing said shaft, a member on said shaft, means for slidably mounting said member on said shaft and connecting said member for rotation with said shaft, said member including an annular guideway and a cam element adapted for successively engaging said operating elements to effect successive operation of said switch means, spring means for normally maintaining said member in a position on said shaft to prevent engagement of said operating elements by said cam element, a pivotally mounted lever having a pair of arms, one of said arms having means for connecting the same with said annular guideway, and power actuated means operable in response to the detection of suspended matter in fluids and being connected to the other arm of said lever for rocking the same to move said member into a position on said shaft to render said cam element effective to engage said operating elements, said cam element being so constructed and arranged to at all times be adapted to engage one of said operating elements and at any particular time to engage only one of said operating elements.

ARTHUR W. UHL.

References Cited in the file of this patent

UNITED STATES PATENTS

| Number | Name | Date |
| --- | --- | --- |
| 2,222,218 | Wallace | Nov. 19, 1940 |
| 2,407,361 | Wilson | Sept. 10, 1946 |
| 2,506,394 | Strange | May 2, 1950 |
| 2,550,411 | Gemmel | Apr. 24, 1951 |